US011611873B2

(12) United States Patent
Pognant

(10) Patent No.: US 11,611,873 B2
(45) Date of Patent: Mar. 21, 2023

(54) METHOD FOR MONITORING ACCESS TO A USER SERVICE INTENDED FOR MONITORING OF A HOME-AUTOMATION INSTALLATION

(71) Applicant: OVERKIZ, Metz-Tessi (FR)

(72) Inventor: Sylvain Pognant, Seynod (FR)

(73) Assignee: SOMFY ACTIVITIES SA, Cluses (FR)

( * ) Notice: Subject to any disclaimer, the term of this patent is extended or adjusted under 35 U.S.C. 154(b) by 463 days.

(21) Appl. No.: 16/346,774

(22) PCT Filed: Oct. 26, 2017

(86) PCT No.: PCT/FR2017/052948
§ 371 (c)(1),
(2) Date: May 1, 2019

(87) PCT Pub. No.: WO2018/083398
PCT Pub. Date: May 11, 2018

(65) Prior Publication Data
US 2019/0306144 A1  Oct. 3, 2019

(30) Foreign Application Priority Data
Nov. 2, 2016 (FR) .................................. 16/60575

(51) Int. Cl.
*H04W 12/06* (2021.01)
*H04L 12/28* (2006.01)
(Continued)

(52) U.S. Cl.
CPC ......... *H04W 12/06* (2013.01); *H04L 12/2803* (2013.01); *H04L 12/4625* (2013.01);
(Continued)

(58) Field of Classification Search
CPC ............ H04L 12/2803; H04L 12/4625; H04L 41/28; H04L 63/0807; H04L 63/083;
(Continued)

(56) References Cited

U.S. PATENT DOCUMENTS 11,017,376 B1\* 5/2021 Dietrich ................ H04W 4/027
2014/0227999 A1 8/2014 Ferlin
(Continued)

FOREIGN PATENT DOCUMENTS

| EP | 2884716 A1 | 6/2015 |
| FR | 2913551 A1 | 9/2008 |
| FR | 2978891 A1 | 2/2013 |

OTHER PUBLICATIONS

International Search Report for Application No. PCT/FR2017/052948.
Written Opinion for Application No. PCT/FR2017/052948.

*Primary Examiner* — Thu V Nguyen
*Assistant Examiner* — Aye M Aung
(74) *Attorney, Agent, or Firm* — Cantor Colburn LLP

(57) ABSTRACT

The present invention relates to a method for controlling access to a user service (Svc1) intended to control a home-automation installation (Su) comprising at least one home-automation device (D) and at least one central control unit (U), the method being implemented by a managing unit (Sv) and comprising the following steps: a step (Escv118) of receiving from a maintenance user (Usr2) a request to access the user service (Svc1) as a final user (Usr1), based on an identifier of the final user (Usr1ID) and an authentication token (Tk1D); a step (ESvc119) of verifying the validity of the authentication token (Tk1D) via a repository (SvAuth) for authenticating token validity, in order to authenticate as a final user (Usr1) with a view to access to the user service (Svc1); and a step (ESvc122) of authorising access of the
(Continued)

maintenance user (Usr2) to the user service (Svc1) as final user (Usr1) if the identification token (Tk1D) is observed to be valid.

20 Claims, 4 Drawing Sheets

(51) Int. Cl.
    *H04L 9/40*     (2022.01)
    *H04L 67/146*     (2022.01)
    *H04L 41/28*     (2022.01)
    *H04L 12/46*     (2006.01)

(52) U.S. Cl.
    CPC ............ *H04L 41/28* (2013.01); *H04L 63/083* (2013.01); *H04L 63/0807* (2013.01); *H04L 63/102* (2013.01); *H04L 67/146* (2013.01)

(58) Field of Classification Search
    CPC ................. H04L 63/102; H04L 67/146; H04L 63/0853; H04L 63/10; H04L 12/2809; H04L 12/2821; H04W 12/06
    See application file for complete search history.

(56) References Cited

U.S. PATENT DOCUMENTS

| | | | | |
|---|---|---|---|---|
| 2014/0361866 | A1* | 12/2014 | Evans | H04L 63/102 |
| | | | | 340/4.32 |
| 2015/0172283 | A1* | 6/2015 | Omnes | H04W 12/08 |
| | | | | 726/9 |
| 2016/0277439 | A1* | 9/2016 | Rotter | H04L 63/0861 |
| 2016/0381006 | A1* | 12/2016 | Rykowski | H04L 63/06 |
| | | | | 713/156 |
| 2017/0017781 | A1* | 1/2017 | Turgeman | H04L 63/08 |
| 2017/0270723 | A1* | 9/2017 | He | G07C 9/29 |
| 2018/0026799 | A1* | 1/2018 | Pottier | H04L 9/3226 |
| | | | | 713/156 |
| 2018/0091506 | A1* | 3/2018 | Chow | G06Q 20/085 |
| 2018/0115611 | A1* | 4/2018 | Lear | H04L 63/20 |
| 2018/0270064 | A1* | 9/2018 | Gehrmann | H04W 4/60 |

* cited by examiner

METHOD FOR MONITORING ACCESS TO A USER SERVICE INTENDED FOR MONITORING OF A HOME-AUTOMATION INSTALLATION

CROSS REFERENCE TO RELATED APPLICATIONS

This application is a National Stage of PCT Application No. PCT/FR2017/052948 filed on Oct. 26, 2017, which claims priority to French Patent Application No. 16/60575 filed on Nov. 2, 2016, the contents each of which are incorporated herein by reference thereto.

FIELD OF THE INVENTION

The present invention concerns a method for monitoring access to a user service intended for monitoring of a home automation installation.

PRIOR ART

A home automation installation of a building may comprise a plurality of home automation devices. It is known to proceed with the configuration, and with the monitoring, that is to say with the control and/or the supervision of said installation using a central control unit which communicates with one or several home automation device(s).

By its very nature, such a home automation installation is a heterogonous environment. Upon an incident on the installation, corresponding for example to the detection of a defect by the end user or a dysfunction, it may turn out to be difficult for a maintenance operator or user, in particular in remote maintenance, to identify the source of the defect or of the dysfunction amongst the different elements composing the installation.

In particular, it may be difficult for a maintenance user to replicate the conditions or the configuration in which a user has been able to detect a dysfunction.

The present invention aims at solving all or part of the above-mentioned drawbacks.

DISCLOSURE OF THE INVENTION

To this end, the present invention concerns a method for monitoring access to a user service intended for the monitoring of a home automation installation comprising at least one home automation device and at least one central control unit, the method being implemented by a management unit or by the at least one central control unit and comprising the following steps:
  A step of receiving a request for access to the user service emitted by a maintenance user for an access to the service as an end user, on the basis of an identifier of the end user and of an authentication token;
  A step of checking up the validity of the authentication token, before a repository of validity of the authentication tokens, for an authentication as an end user for access to the user service;
  A step of authorizing access to the maintenance user as an end user to the user service when finding that the identification token is valid.

Thanks to the arrangements according to the invention, access to the user service is authorized on the basis: either of an end user identifier and a password or another personal identification element of the end user; or of an end user identifier and an authentication token with a limited validity.

It is possible for the maintenance user to have access to the user service using the same parameters as the end user, and therefore an identical configuration, which allows finding out difficulties encountered by the end user without any bias due to a different configuration of the access parameters. These arrangements allow avoiding complementary developments, and in particular it is not necessary to create an administrator account or a corresponding interface for the user service. Moreover, the modifications performed by the maintenance user as the end user will be directly applied to the account of the end user. These arrangements also allow the preservation of the privacy of the password of the end user.

Thus, the setup of the incident management is facilitated by allowing proceeding with remote check-ups by the maintenance users on the user service in connection with the central control units and/or the home automation devices belonging to one or several home automation installation(s) of an end user.

In the context of the present invention, a user service corresponds to a computerized service, in particular a remotely-accessible service, which enables access to at least one monitoring or supervision function of a home automation installation or of a home automation device, by means of a user interface. The user interface may be accessible via a graphical interface, or via a programming interface.

In the context of the present invention, an authentication token corresponds to an authentication identifier intended for a single or limited use related to a determined user. The repository of validity of the authentication tokens is a service or a storage of validity data of the authentication tokens.

According to an aspect of the invention, the management unit is a server remotely connected to the at least one home automation installation, via a wide area network. It should be noted that the term server is a logical designation which may cover the use of several physical servers to distribute the computer processing load to be carried out.

According to another aspect of the invention, the management unit is a central unit intended to be related to one or several central control units on distinct private or local area networks, or still on the same local area network.

In the context of the invention, a maintenance user or support user is a user in charge of responding to the calls or to the queries from the end users, these queries may be punctual or in the form of a subscription to a supervision of the installation, in particular within a call center.

In the context of the present invention, a home automation device is a home automation equipment and/or a sensor, or still a portion of a home automation equipment or a portion of a sensor corresponding to a functional subset. A home automation device may also correspond to a control point of other home automation devices.

In the context of the present invention, a message is an information element notified or received via a communication module from an external equipment, or in the form of a synchronous or asynchronous call, which may also correspond to a local or remote function call.

In the context of the present invention, an installation is a set comprising a plurality of home automation devices and at least one central control unit disposed on one single building or on a plurality of locations, each home automation device being related to a central control unit among the plurality of central control units, the plurality of central control units forming a group under the control of one user. The electronic devices form groups of at least one home automation device related to a central control unit.

In the context of the present invention, a central control unit of the home automation installation is an electronic unit comprising:
- at least one processing unit for containing and executing at least one computer program,
- at least one communication module intended to monitor and/or control at least one home automation device; and
- at least one module for communication with the management unit.

The electronic unit may be independent from or integrated into a home automation device. In the latter case, the communication module intended for the monitoring and/or control of the device may be a communication device internal to the home automation device and/or a communication module intended for the monitoring and/or control of other home automation devices. In some applications, a central control unit may communicate with the management unit through an intermediate management unit, for example a third-party service provider, whose intermediate management unit provides a service interface or API.

The central control unit may also be integrated to a router and/or a modem achieving a connection to a wide area network, in particular the Internet.

According to a first possibility, the user service may be configured to prevent concurrent access between the maintenance user using an identification token and the end user.

According to a second possibility, the service may be configured to enable a concurrent access between the maintenance user using an identification token and the end user.

In the case where a concurrent access is possible between the maintenance user using an identification token and the end user, the user service may be configured to offer a normal mode and a mode preventing all modifications if the maintenance user is connected. Thus, some functions are deactivated for the end user when the maintenance user is connected.

According to an aspect of the invention, the method further comprises a step of updating the validity of the identification token in the repository of validity of the authentication tokens.

According to an aspect of the invention, the step of updating the validity of the identification token in the repository of validity of the authentication tokens is part of the access authorization step. Thanks to these arrangements, it is possible to guarantee that the two operations are carried out together, and not authorize supplementary accesses in case of dysfunction of the system between these steps.

According to an aspect of the invention, the step of updating the validity of the identification token in the repository of validity of the authentication tokens is carried out subsequently to or concurrently with the access authorization step.

According to an aspect of the invention, the step of updating the validity of the identification token in the repository of validity of the access tokens corresponds to an invalidation of this token. The token may be intended for a single use or have a limited number of uses.

According to an aspect of the invention, the method comprises the following steps, prior to the step of requesting access to the user service:
- A step of receiving a request for generating an authentication token for access to the user service by a maintenance user as an end user;
- A step of checking up the authorization of the maintenance user to access the service as the end user;
- A step of generating an authentication token, associated to the identifier of the user, if the maintenance user is authorized to access the service as the end user;
- A step of recording the validity of the identification token in the repository of validity of the access tokens.

According to an aspect of the invention, the method comprises:
A step of communicating the token to the maintenance user or to a maintenance service.

According to an aspect of the invention, the authentication token is associated to a period of validity beyond which it is no longer usable.

According to an aspect of the invention, the request for access to the user service emitted by a maintenance user is made via a maintenance service.

According to an aspect of the invention, the maintenance service accesses a user interface of the user service by providing the authentication token.

According to an aspect of the invention, the authentication token is pre-filled in an access page of the user interface by the maintenance service.

According to an aspect of the invention, the step of checking up the authorization of the maintenance user to access the service as the end user comprises:
A step of checking up the access rights of the maintenance user to the user service before an access right repository.

According to an aspect of the invention, the access right repository may be coincident with or distinct from the repository of validity of the authentication tokens.

According to an aspect of the invention, the step of checking up the authorization of the maintenance user to access the service as the end user comprises:
A step of requesting authorization from the end user.

According to an aspect of the invention, the authorization is requested from the end user for example through a graphical interface of the user service.

According to an aspect of the invention, the step of checking up the authorization of the maintenance user to access the service as the end user comprises:
A step of authenticating the maintenance user on the basis of a session token.

According to an aspect of the invention, the authentication token is associated to an information identifying the maintenance user.

These arrangements enable a traceability of the actions carried out by the maintenance user as the end user. This information may be integrated to the token or stored in the repository of validity of the tokens.

The different aspects defined hereinabove that are not incompatible may be combined.

BRIEF DESCRIPTION OF THE FIGURES

The invention will be better understood using the detailed description which is disclosed hereinbelow in connection with the appended drawing in which.

DESCRIPTION WITH REFERENCE TO THE FIGURES

In the following detailed description of the figures defined hereinabove, the same elements or the elements filling identical functions may preserve the same references so as to simplify the understanding of the invention.

Description of a System Comprising a Home Automation Installation

Figure 1:
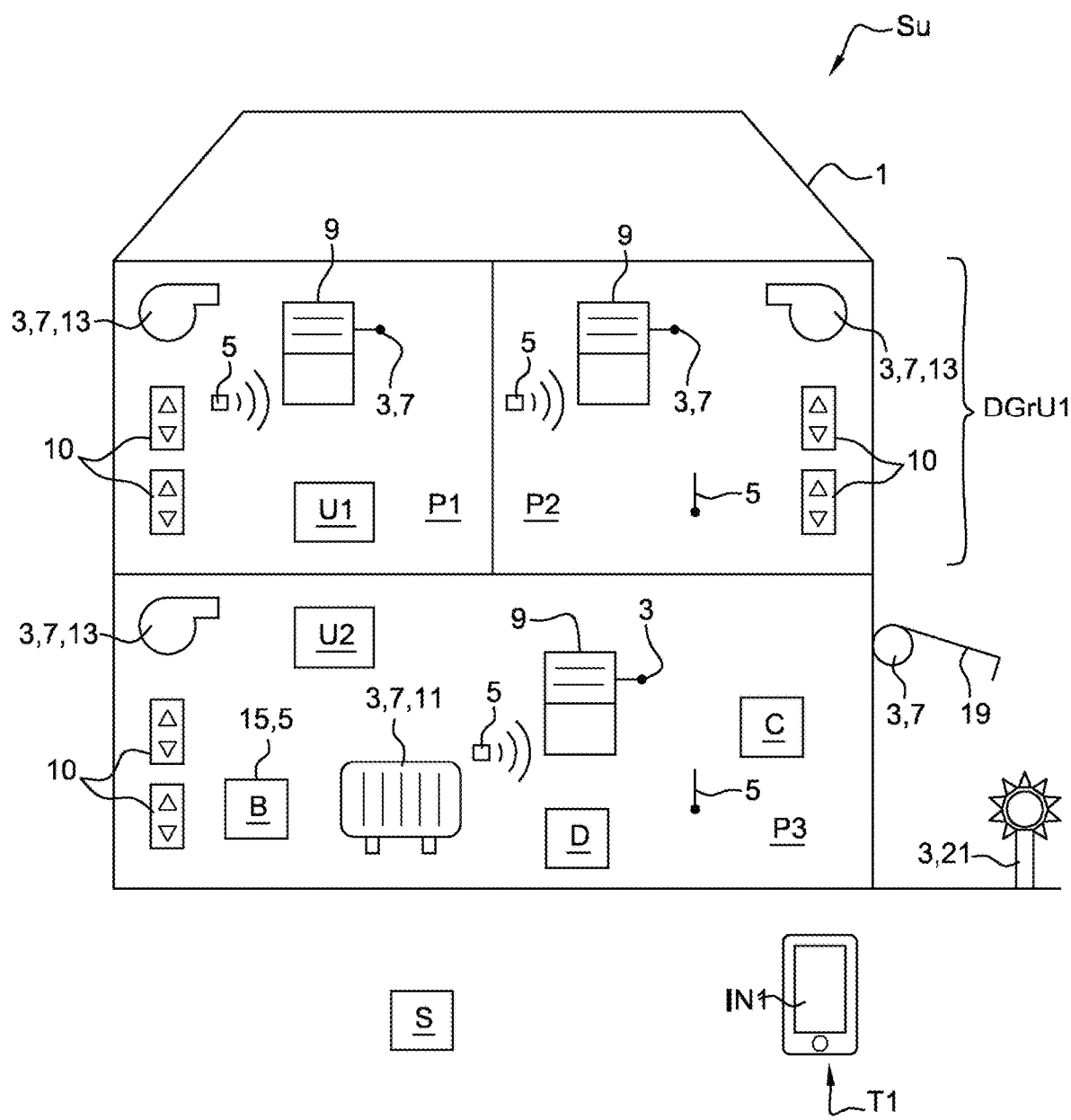
FIG. 1 is a schematic view of a building and of a home automation installation in accordance with an embodiment of the invention.

As illustrated in FIG. 1, a building 1 comprises for example three rooms P1, P2, P3. The building 4 also comprises home automation equipment 3 and sensors 5.

A home automation equipment 3 may consist of an actuator arranged to displace or set an element of the building 1, for example an actuator 7 for displacing a rolling shutter 9 or a terrace awning 19, or a regulation system 10 for a heater 11 or a ventilation system 13. A home automation equipment 3 may also consist of a lighting, for example a terrace external lighting 21 or a lighting control system, an alarm system, or still a video camera, in particular a video-surveillance camera.

The home automation installation Su may also comprise a control point 15 an actuator 7, such as a wireless control box B for the rolling shutter 9.

The home automation installation Su may comprise one or several sensor(s) 5, integrated to an actuator 7, to a control point 15 or to the control box B or independently of these elements. In particular, a sensor 5 may be arranged to measure a physical unit, for example a temperature sensor, a sun sensor or a humidity sensor. Position sensors 5 of home automation equipment 3 of the building 1, such as, for example, sensors of the open state of a rolling shutter 9 or sensors of the position of a door leaf such as a window, whether motorized or not, may also be provided. The home automation installation may also comprise one or several presence sensor(s).

A home automation equipment 3 and a sensor 5 should thus be considered as units having information on observed actual states of elements of the building 1 and being capable of sharing this information with other elements of the home automation installation Su.

The home automation equipment 3 and the sensors 5 can thus have access to any measurable physical unit, such as the temperature of each room P1, P2, P3 or a state of an element of the building 1, such as the open state of a rolling shutter 9, the state of an alarm, etc.

In the following, we will use the home automation device or device D designation indifferently to designate sensors or home automation equipment, or parts of home automation equipment 3 or sensors 5.

In general, the home automation devices comprise a processing unit comprising a processor executing an embedded software. This software undergoes updates to improve the functions thereof or to proceed with corrections.

The home automation installation Su comprises one central control unit or a plurality of central control units U1, U2. In particular and as example, two central control units U1, U2 are represented in FIG. 1. According to one variant, a home automation installation may also comprise one single central control unit.

Each central control unit U1, U2 is arranged to control and/or monitor part of the devices D of the installation Su forming a group DGrU1, DGrU2. As example, in FIG. 1, the central control unit U1 is in charge of the devices D disposed in the rooms P1 and P2 of the first floor of the building, whereas the central control unit U2 is in charge of the devices D disposed in the room P3 on the ground floor of the building and the external devices.

In particular, the control and/or monitoring is carried out remotely, in particular using a wireless communication protocol, for example a radio communication protocol. Each central control unit U1, U2 is arranged to group together all data originating from the devices D of its group DGrU1, DGuU2 and to process these data.

Figure 2:
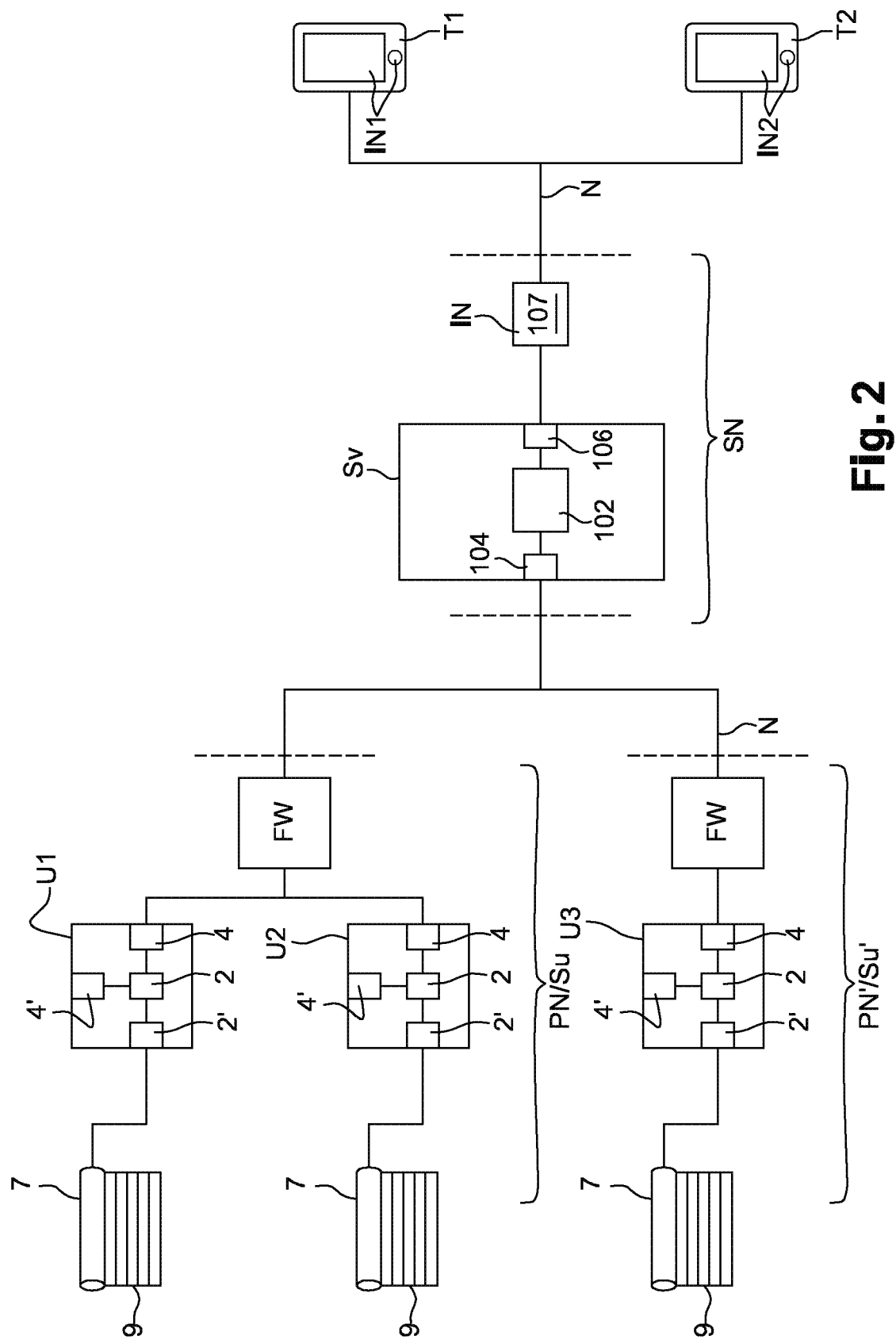
FIG. 2 is a diagram presenting an architecture of a system comprising the home automation installation illustrated in FIG. 1, a second home automation installation, as well as a server intended to be connected to a user terminal.

As represented in FIG. 2, each central control unit U is arranged to communicate with a server Sv.

The central control units U1, U2, U3 are disposed on a private network PN, PN', whose access is generally protected by a firewall FW. In particular, in the example represented in FIG. 2, two central control units U1, U2 are disposed on a first private network corresponding to a first home automation installation, whereas a third central control unit U3 is disposed on a second private network PN', independent of the private network PN corresponding to a second home automation installation Su'. The server Sv is also disposed on a private network SN. The private network PN is linked to a wide area network N, for example the Internet. Of course, the server Sv is arranged to communicate with a set of such central control units U. We will describe in the following one of these units.

A central control unit U comprises a processing unit 2 arranged to contain and execute a first computer program. As example, the processing unit 2 comprises a processor, a storage flash memory as well as a random access memory, and an Ethernet chip.

The processing unit executes an embedded software. This software undergoes updates to improve the functions thereof or to proceed with corrections.

The central control unit U further comprises at least one communication module 2' intended to monitor and/or control home automation equipment 3 and/or sensors 5, the home automation equipment 3 may consist of actuators 7, lightings 21, an alarm system, or a video camera.

As example, as represented in FIG. 2, the communication module 2' enables the monitoring and control of at least one actuator 7, a movable element of the building 1, such as for example a rolling shutter 9, or an orientable sunshade 9' or other actuators 7 or lightings 21, as previously described with reference to FIG. 1, according to the first local communication protocol P1.

As example, the communication module 2' may be arranged to implement for example one or more of the first local protocols P1 such as for example Z-Wave, EnOcean, io-Homecontrol, Somfy RTS, KNX, MODBUS, Wavenis, Philips HUE. In general, these first local protocols are non-IP local communication protocols.

According to another possibility, for example in the context of alarm systems, the central control unit may be integrated into the home automation device. According to still another possibility, the central control unit may also be integrated to a router and/or a modem achieving a connection to a wide area network, in particular the Internet.

In the case where the central control unit is integrated to a home automation device, the communication module 2' intended for the monitoring and/or control of the device may be a communication module internal to the home automation device and/or a communication module intended for the monitoring and/or control of other home automation devices.

There is also provided the reception of information from a sensor 5 providing information on the presence of a user or values of the surrounding parameters such as temperature, humidity and luminosity. In the same manner, the central unit U may enable the monitoring and/or control of an alarm system.

Each central control unit U may further comprise a communication module 4' for communicating according to a second target communication protocol P2, with a mobile communication terminal T. For example, the second target communication protocol may be a protocol above the IP protocol on a local area network, or else a generic point-to-point protocol. As example, the application protocol WEAVE using transport protocols 6lowpan and thread for a mesh network may constitute a second target protocol. Other examples include Bluetooth, Zigbee or Wifi.

The communication terminal T may contain and execute an application software APP.

Each central control unit U further comprises a module 4 for communicating with the server Sv. The server Sv enables the remote control and/or monitoring and comprises one or several processing unit(s) 102 arranged to contain and execute a second computer program.

In some applications, a central control unit U may communicate with the server Sv through an intermediate server, for example a third-party service provider, whose intermediate server provides a service interface or API. In turn, the server Sv comprises at least one communication interface 104 intended for the communication with the central unit U.

The server Sv may also comprise a communication interface 106 intended for the communication with a control and/or monitoring interface IN enabling an end user Usr1 to remotely monitor the home automation installation, in particular via a user service Svc1.

It should be noted that the term server is a logical designation which may cover the use of several physical servers to distribute the computer processing load to be carried out.

For example, the control and/or monitoring interface IN comprises a web server 107 and a mobile communication terminal T1 communicating via the wide area network N. For example, the mobile communication terminal T1 may consist of a smartphone or a tablet. The mobile communication terminal T1 may be the same or a terminal of the same type as that with which the central control unit U communicates locally by means of the communication module 4', or a different terminal. We will designate these mobile terminals indifferently by the reference T1. Alternatively, the end user may also use a stationary terminal.

The control and/or monitoring interface IN1 comprises a processor which may be disposed at the level of the web server 107 and/or the mobile communication terminal T1.

The processor of the control and/or monitoring interface IN is arranged to use a third computer program. In turn, this third computer program is arranged to execute a downloadable application.

The mobile communication terminal T comprises a data input device and a display device, for example in the form of a tactile control portion of a screen of the terminal T and in the form of one or several button(s) of the terminal T.

Unique Identifier of a Home Automation Device

The server Sv and the central control units U may use a unique identifier to identify the home automation devices. The structure of a unique identifier of a home automation device DURL will now be described in connection with a particular embodiment.

According to this embodiment, the unique identifier of a home automation device comprises information on:
- The local native protocol of the home automation device D;
- The communication path to the device D, including the intermediate central control units U and the addresses of endings to be crossed, whether organized or not in a hierarchical topology;
- A subsystem identifier subsystemId if the device belongs to a group of devices D associated to the same address. The devices that are a unique expression of an address have no extension for identifying a subsystem.

Thus, the form of the unique identifier of a device DURL may be as follows:

<protocol>://<gatewayId>/<rawDeviceAddress>(#<subsystemId>)

Wherein the following fields are present:
protocol: identifier of the native device local protocol.
gatewayId: identifier of the first central control unit U, for example a serial number or a unique identifier.
rawDeviceAddress: a simple or multi-level path. Its meaning and its format depend on the addressing scheme of the local communication protocol of the device D.
subsystemId: this optional field indicates an identification, for example a rank of the subsystem (starting for example at 1), if such a subsystem is present.

EXAMPLES

1) Knx://0201-0001-1234/1.1.3
This unique identifier DURL corresponds to a device D communicating by the KNX protocol with an individual address 1.1.3 accessible to the central control unit U carrying the identifier #0201-0001-1234.

2) io://0201-0001-1234/145036#2
This unique identifier GDURL corresponds to a subsystem carrying the number 2 associated to a device D communicating by the io-Homecontrol protocol with a radio address 145036 accessible to the central control unit U carrying the identifier #0201-0001-1234.

Maintenance Users and End Users

As represented in FIG. 2, the server or group of servers Sv can communicate with at least one terminal in the possession of at least one end user Usr1 of the installation Su.

The server or group of servers Sv can remotely interact with at least one user Usr2 having a user profile of a second type corresponding to a maintenance operator or user, in particular a maintenance user in charge of responding to the calls or to the queries of the end users Usr1, by providing a maintenance service Svc2 for the remote monitoring or the administration of the at least one installation Su.

To this end, an interface IN2 is made available by the server Sv. Access to this interface may be achieved via an application executed on a user terminal T2 of the second user Usr2, or by access by a light client.

User Service, Maintenance Service, Authentication Services

Figure 3:
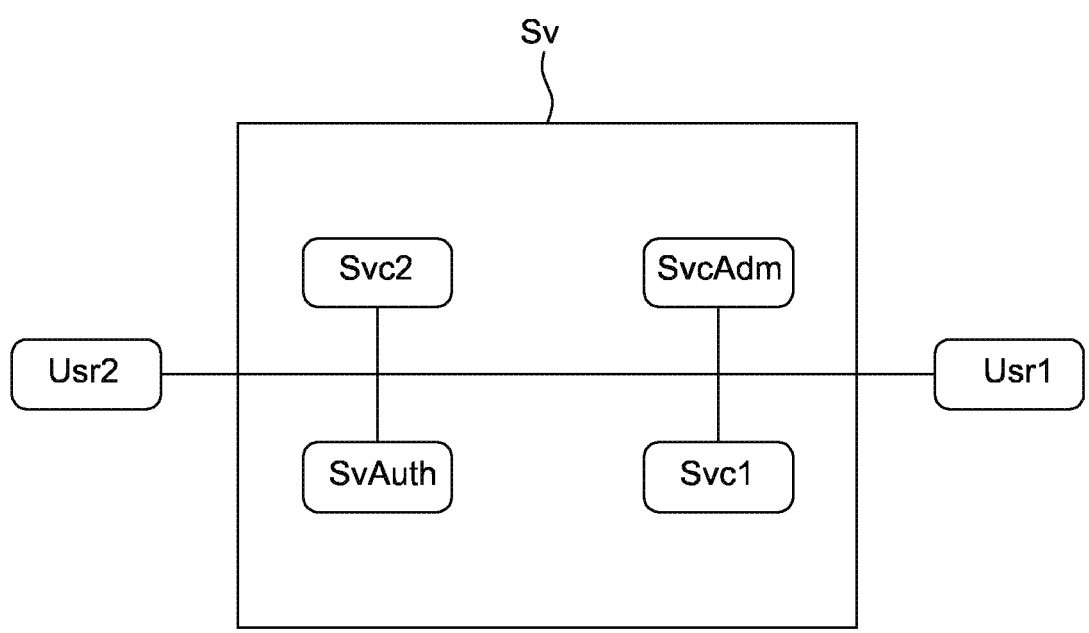
FIG. 3 is a diagram representing a server or a group of servers grouping together monitoring or control services of an installation, as well as administration or authentication services.

The Server Sv or a group of Servers Sv hosts one or several software servers intended to provide services, as illustrated in FIG. 3.

In particular, a first service Svc1 corresponds to a user service intended for the monitoring of the home automation installation Su by an end user Usr1. The user service Svc1 is a remotely-accessible computerized service, which enables access to at least one monitoring or supervision function of a home automation installation or of a home automation device, by means of a user interface. The user interface may be accessible via a graphical interface, or via a programming interface.

A second service corresponds to an authentication service SvAuth. This authentication service or server manages a first repository of a first set of end users and their access rights to the service Svc1. We will indifferently use the reference SvAuth for the service and the corresponding repository.

A third service Svc2 corresponds to a remote administration or maintenance service or interface of one or of a set of home automation installation(s) or of home automation devices belonging to one or several home automation installation(s) Su.

A fourth service SvAdmin manages a second repository of a second set of maintenance users and their access to the service SvUsr2. We will indifferently use the reference SvAdmin for the service and the corresponding repository.

The second services and the fourth service may be coincident and correspond to the same authentication service or server. In the same manner, the second and the first services may be coincident.

In the context of the present invention, the role of the server or authentication service SvAuth is as follows:
  This service SvAuth serves to validate whether an end user identifier (for example: login) and password pair is valid. Alternatively, the password may be replaced with another personal identification element of the end user, for example a biometric fingerprint;
  This service SvAuth serves to create an authentication token for a single use or intended for a limited number of uses and/or for a limited period and for a determined user;
  The service SvAuth serves to validate whether an end user identifier and authentication token pair is valid.

The method concerns a first user Usr1 who is an end user of the home automation installation.

The method also concerns a second user Usr2 of a second type corresponding to a maintenance user who wishes to pass off as the first user Usr1.

The conditions for the second user Usr2 of the second type being able to pass off as the user of the first type Usr1 are the following ones:
  The user Usr2 is authenticated as the user of the second type or maintenance user;
  The user Usr2 can pass off as the user Usr1 because of his role or because the authorization granted by Usr1.

The user service Svc1 may be configured to prevent concurrent access between the maintenance user Usr1 using an identification token and the end user Usr1, so that the two users could not emit commands in the installation at the same time.

Alternatively, the user service Svc1 may be configured to enable a concurrent access between the maintenance user using an identification token and the end user. In this case, the user service Svc1 may be configured to offer a normal mode corresponding to the connection of an end user alone and a mode preventing all modifications if the maintenance user is connected. Thus, some functions are deactivated for the end user when the maintenance user is connected at the same time as the end user.

According to one variant, the user service Svc1 may be hosted on a central control unit. In this case, the user service can remotely access the authentication service SvAuth which may be hosted on the server.

Method for Taking Control of a User Account

Figure 4:
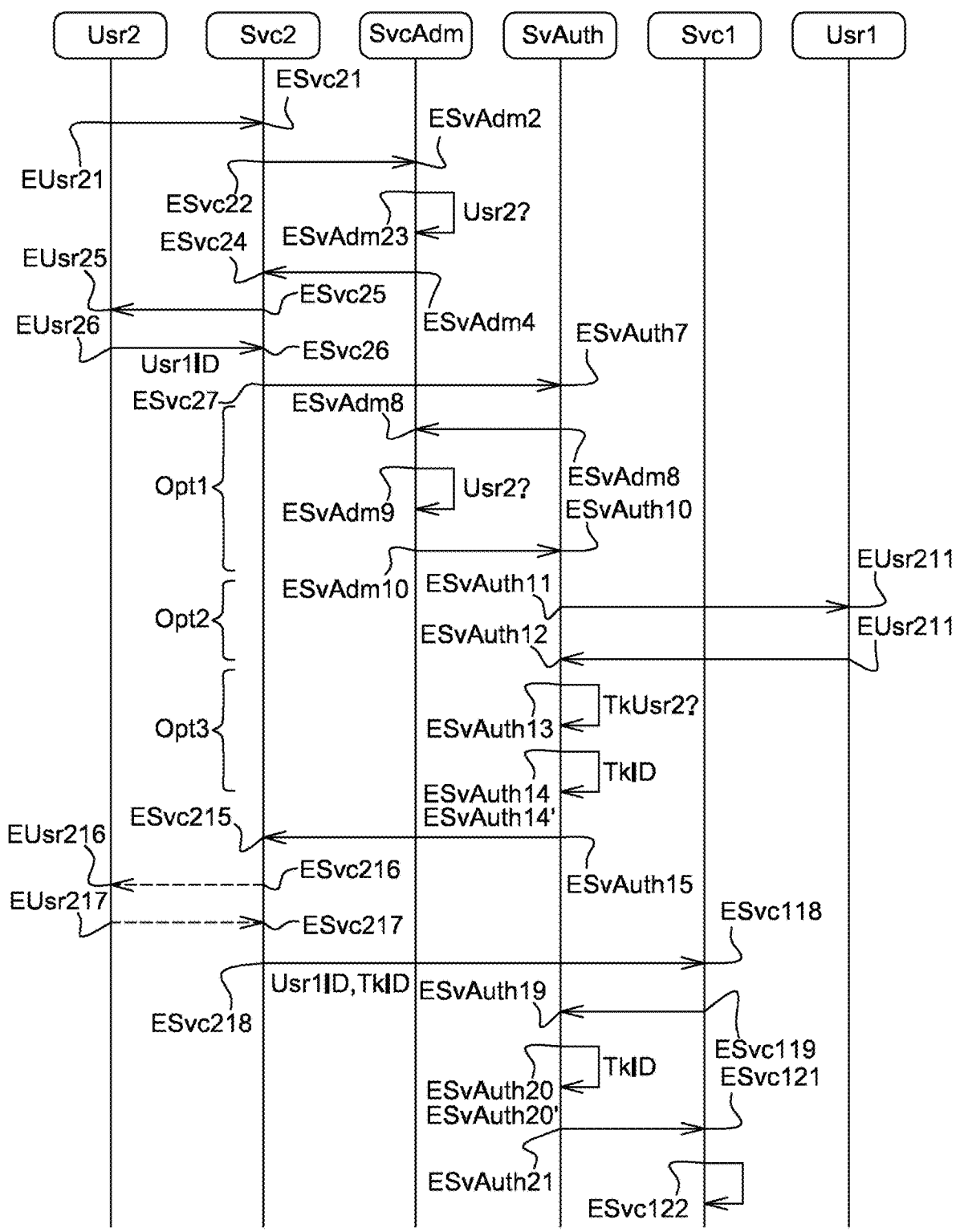
FIG. 4 is a diagram illustrating a mode of implementation of a method for monitoring access to a user service intended for the monitoring of a home automation installation according to the invention.

We will now describe a mode of implementation of a method for monitoring access to a user service Svc1 with reference to FIG. 4.

At a step EUsr21, the second user or maintenance user Usr2 emits a request for authentication before the service Svc2 which receives this request at a step ESvc1.

The service ESvc22 emits an authentication query before the service SvAdmin which receives this query at a step ESvAdmin2.

The service SvAdmin checks up that the user Usr2 has an existing profile having access rights to the service Svc2 at a step ESvAdmin23 before the repository. We assume herein that a user profile has been previously created for Usr2.

The service SvAmin sends back an answer corresponding to the result of the check-up at a step ESvAdm4, the answer message possibly comprising an access token TkUsr2 to the service Svc2, the answer message being received by the service Svc2 at a step ESvc24.

The authorization of access to the service Sv2 is confirmed and transmitted to the user at a step ESvc25, the second user taking note thereof at a step EUsr25.

At a step EUsr26, the second user Usr2 emits a request for access as a first user of the first type Usr1 before the service Svc1.

This request is received by the service Svc2 at a step ESvc26.

The Service Svc2 emits at a step ESvc27 the request addressed to the service SvAuth which receives it at a step ESvAuth7.

Next, the service SvAuth checks on the identity of the user Usr2 and the rights of this user. This check-up may be processed in several distinct ways, which may be combined.

According to a first option Opt1, the service SvAuth sends at a step ESvAuth8 a request to the service SvAdmin, which receives it at a step ESvAdm8.

The service SvAdmin checks up that the user Usr2 has an existing profile having access rights to the service Svc1 at a step ESvAdmin9.

The service SvAmin sends back an answer corresponding to the result of the check-up at a step ESvAdm10, the answer message being received by the service SvAuth at a step ESvAuth10.

According to a second option Opt2, the service SvAuth sends at a step ESvAuth11 a request for authorization to the user Usr1, for example through a graphical interface of the service SvC1, the user receiving this request at a step EUsr211.

The user sends an answer to this request at a step EUsr212, for example via the graphical interface of the service Svc1, the answer message being received by the service SvAuth at a step ESvAuth12.

According to a third option Opt3, the service SvAuth proceeds at a step ESvAuth13 with an authentication of the user Usr2 on the basis of an authentication token TkUsr2 communicated for example during the request for authentication received at step ESAuth7.

When the user Usr2 is authenticated as a user having sufficient access rights to connect as the user Usr1, the service SvAuth can then generate, at a step EsvAuth14, an authentication token TkID, associated to the identifier of the user Usr1. This token TkID is associated to a period of validity beyond which it is no longer usable.

During this step, the authentication service SvAuth may memorize an association between the authentication token TkID and the second user Usr2 in its repository.

This token may be communicated to the user Usr2 at a step EsvAuth15, via the service Svc2 at a step ESvc215/ESvc216, the user receiving this token at a step EUsr216.

At a step EUsr217, the user Usr2 can attempt to connect to the service Svc1 by authenticating himself as the user Usr1, by using the identifier of the user Usr1, and the previously obtained token TkID.

This attempt may be carried out via the service Svc2, which is represented by steps ESvc17 and ESvc18, the service Scv1 receiving the connection query at a step EScv118. The service Svc2 can directly open the user interface of the service Svc1 by providing the token TkID, in a pre-filled manner.

The service Svc1 checks up that the provided elements, namely the identifier of the user Usr1 and the token TkID enable an authentication.

To this end, the service Svc1 sends at a step 8 a request for authentication of the identifier of the user Usr1 and the token TkID to the service SvAuth, which receives it at a step ESvAuth19.

The service SvAuth checks up that the token TkID is a valid token for an authentication as the user Usr1 for access to the service Svc1 at a step ESvAuth20. During this step, an invalidation of the token for a subsequent query is performed. It is also possible to consider a decrementation of the possible number of uses if several uses are authorized.

The service SvAmin sends back an answer corresponding to the result of the check-up at a step ESvAuth21, the answer message being received by the service Svc1 at a step ESvc121.

If the answer is positive, access is granted by the service Svc1 at a step Escv122.

Hence, the user Usr2 is connected as the user Usr1 and is seen by the service Svc1 as the user Usr1.

It should be noted that the token TkID may be associated to an identifier information of the user Usr2, to enable traceability of the actions carried out by the user Usr2 as the user Usr1. Indeed, should this not be the case, there is no means to determine whether the actions have been carried out by the user Usr1 or by the user Usr2 as the user Usr1.

According to one variant, the invalidation of the token TkID may be carried out after access to the service Svc1 having been effective and confirmed by the service Svc1.

The invention claimed is:

1. A method for monitoring access to a user service, the user service provided for the monitoring of a home automation installation, the home automation installation comprising at least one home automation device and at least one central control unit, the method being implemented by a management unit or by the at least one central control unit and comprises the following steps:
    a step of receiving a request for access to the user service emitted by a maintenance user for an access to the user service as an end user, on a basis of an identifier of the end user and of an authentication token;
    a step of checking up, in a repository of validity of authentication tokens, a validity of the authentication token for an authenticating the maintenance user as the end user for access to the user service;
    a step of authorizing access of the maintenance user authenticated as the end user to the user service when finding that the authentication token is valid, wherein the maintenance user is connected using an identical configuration and same parameters as the end user and is seen by the user service as the end user without access to a password of the end user.

2. The method according to claim 1, further comprising a step of updating a validity of the authentication token in the repository of validity of authentication tokens.

3. A method for monitoring access to a user service, the user service provided for the monitoring of a home automation installation, the home automation installation comprising at least one home automation device and at least one central control unit, the method being implemented by a management unit or by the at least one central control unit and comprises the following steps:
    a step of receiving a request for generating an authentication token for access to the user service by a maintenance user as an end user;
    a step of checking up an authorization of the maintenance user to access the user service as the end user;
    a step of generating an authentication token, associated to an identifier of the end user, if the maintenance user is authorized to access the user service as the end user;
    a step of recording a validity of the authentication token in a repository of validity of authentication tokens;
    a step of receiving a request for access to the user service emitted by the maintenance user for an access to the user service as the end user, on a basis of the identifier of the end user and of the authentication token;
    a step of checking up, in the repository of validity of authentication tokens, the validity of the authentication token for an authenticating the maintenance user as the end user for access to the user service;
    a step of authorizing access of the maintenance user authenticated as the end user to the user service when finding that the authentication token is valid, wherein the maintenance user is connected using an identical configuration and same parameters as the end user and is seen by the user service as the end user without access to a password of the end user.

4. The method according to claim 3, wherein the step of checking up the authorization of the maintenance user to access the user service as the end user comprises:
    a step of requesting authorization from the end user.

5. The method according to claim 3, wherein the step of checking up the authorization of the maintenance user to access the user service as the end user comprises:
    a step of authenticating the maintenance user on the basis of a session token.

6. A method for monitoring access to a user service, the user service provided for the monitoring of a home automation installation, the home automation installation comprising at least one home automation device and at least one central control unit, the method being implemented by a management unit or by the at least one central control unit and comprises the following steps:
    a step of receiving a request for generating an authentication token for access to the user service by a maintenance user as an end user;
    a step of checking up an authorization of the maintenance user to access the user service as the end user;
    a step of generating an authentication token, associated to an identifier of an end user, if the maintenance user is authorized to access the user service as the end user;
    a step of recording a validity of the authentication token in a repository of validity of authentication tokens;

a step of receiving a request for access to the user service emitted by the maintenance user for an access to the user service as the end user, on a basis of the identifier of the end user and of the authentication token;

a step of checking up, in the repository of validity of authentication tokens, the validity of the authentication token for an authenticating the maintenance user as the end user for access to the user service;

a step of authorizing access of the maintenance user authenticated as the end user to the user service when finding that the authentication token is valid, wherein the maintenance user is connected using an identical configuration and same parameters as the end user and is seen by the user service as the end user without access to a password of the end user;

a step of updating a validity of the authentication token in the repository of validity of authentication tokens.

7. The method according to claim 6, comprising:
a step of communicating the authentication token to the maintenance user or to a maintenance service.

8. The method according to claim 7, wherein the authentication token is associated to a period of validity beyond which it is no longer usable.

9. The method according to claim 8, wherein the request for access to the user service emitted by the maintenance user is made via a maintenance service.

10. The method according to claim 9, wherein the maintenance service accesses a user interface of the user service by providing the authentication token.

11. The method according to claim 10, wherein the step of checking up the authorization of the maintenance user to access the user service as the end user comprises:
a step of checking up, in an access right repository, a right for the maintenance user to access the user service.

12. The method according to claim 11, wherein the step of checking up the authorization of the maintenance user to access the user service as the end user comprises:
a step of requesting authorization from the end user.

13. The method according to claim 12, wherein the step of checking up the authorization of the maintenance user to access the user service as the end user comprises:
a step of authenticating the maintenance user on the basis of a session token.

14. The method according to claim 13, wherein the authentication token is associated to an information identifying the maintenance user.

15. The monitoring method according to claim 3, wherein the step of checking up the authorization of the maintenance user to access the user service as the end user comprises:
a step of checking up, in an access right depository, a right for the maintenance user to access the user service.

16. The method according to claim 3, comprising:
a step of communicating the authentication token to the maintenance user or to a maintenance service.

17. The method according to claim 1, wherein the authentication token is associated to a period of validity beyond which it is no longer usable.

18. The method according to claim 1, wherein the request for access to the user service emitted by the maintenance user is made via a maintenance service.

19. The method according to claim 18, wherein the maintenance service accesses a user interface of the user service by providing the authentication token.

20. The method according to claim 1, wherein the authentication token is associated to an information identifying the maintenance user, and the method comprises the following step:
a step of logging actions carried out by the maintenance user connected as the end user.

* * * * *